United States Patent [19]

Acosta

[11] 4,253,697
[45] Mar. 3, 1981

[54] REMOTE RETRIEVER WITH INTERCHANGEABLE HEAD

[76] Inventor: Adam Acosta, 10260 Bronstein Pl., San Diego, Calif. 92124

[21] Appl. No.: 966,904

[22] Filed: Jan. 8, 1979

Related U.S. Application Data

[63] Continuation-in-part of Ser. No. 846,883, Oct. 31, 1977, Pat. No. 4,135,753.

[51] Int. Cl.³ ................................................. B25J 1/02
[52] U.S. Cl. .............................. 294/115; 294/19 R; 294/65.5; 294/116
[58] Field of Search ..................... 294/19 R, 22, 50.8, 294/65.5, 66 A, 83 AA, 99 R, 100, 104, 115, 116; 15/104.3 G; 350/96.26

[56] References Cited

U.S. PATENT DOCUMENTS

| 182,367 | 9/1876 | Jones | 294/50.8 |
|---|---|---|---|
| 687,165 | 11/1901 | Quinby | 294/115 |
| 1,772,126 | 8/1930 | Barry | 294/65.5 X |
| 1,961,421 | 6/1934 | Hogenson | 294/115 |
| 1,990,686 | 2/1935 | Einhorn et al. | 15/104.3 G |
| 2,790,437 | 4/1957 | Moore | 294/19 R X |
| 2,947,564 | 8/1960 | Winther | 294/100 |
| 3,778,170 | 12/1973 | Howell et al. | 350/96.26 X |

FOREIGN PATENT DOCUMENTS 1171354  5/1964  Fed. Rep. of Germany ........... 294/100

*Primary Examiner*—Johnny D. Cherry
*Attorney, Agent, or Firm*—Ralph S. Branscomb

[57] ABSTRACT

The invention comprises a retrieving instrument featuring a snap-lock handle connected to one end of a flexible cable, the other end of which has a releasible gripping head which may be mechanically or electromagnetically operated, there being an actuation control mechanism which locks the jaw in either the gripping mode or the release mode until the control is changed. A viewing system utilizing newly developed fiber optic techniques is preferably incorporated into the structure.

3 Claims, 13 Drawing Figures

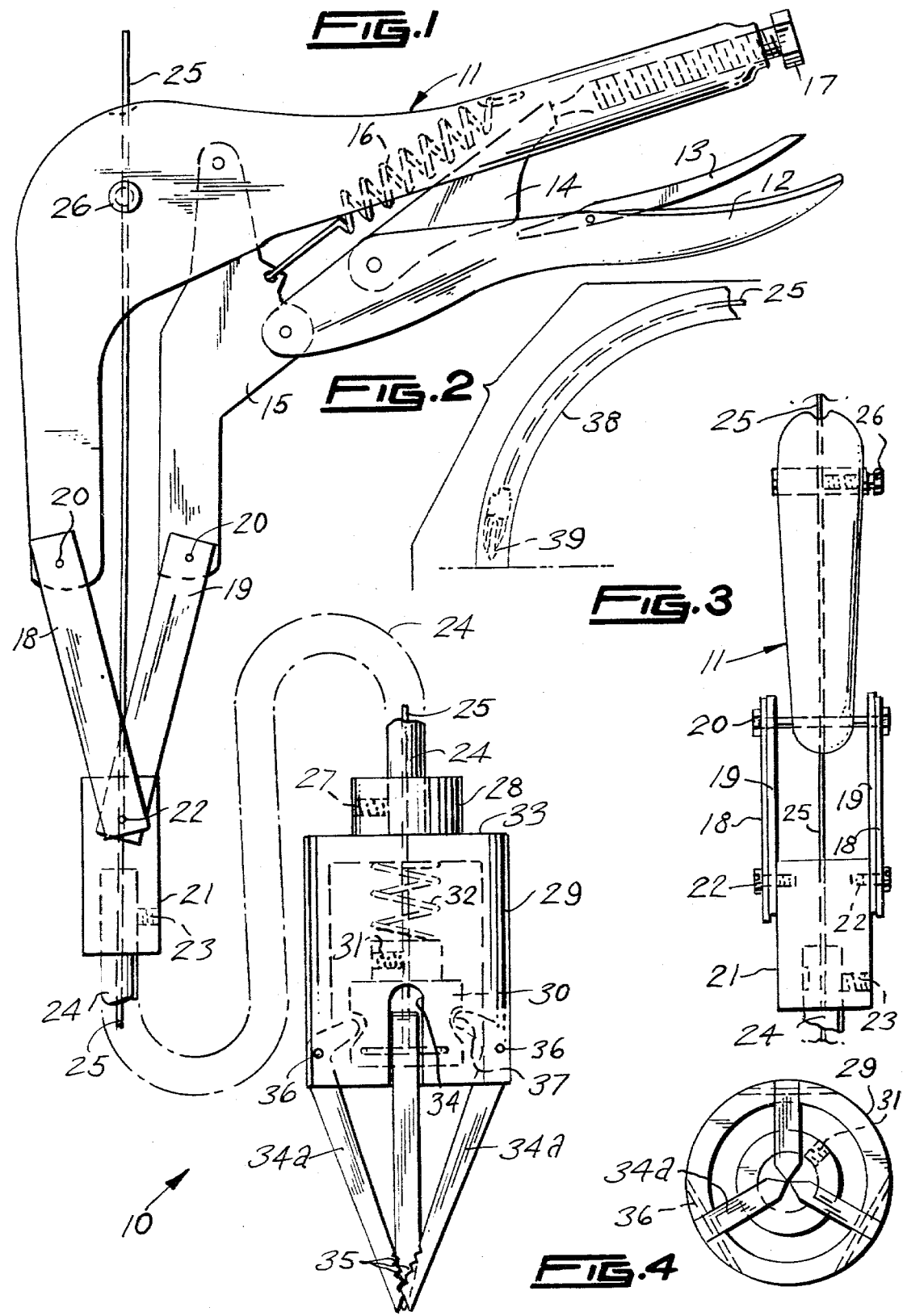

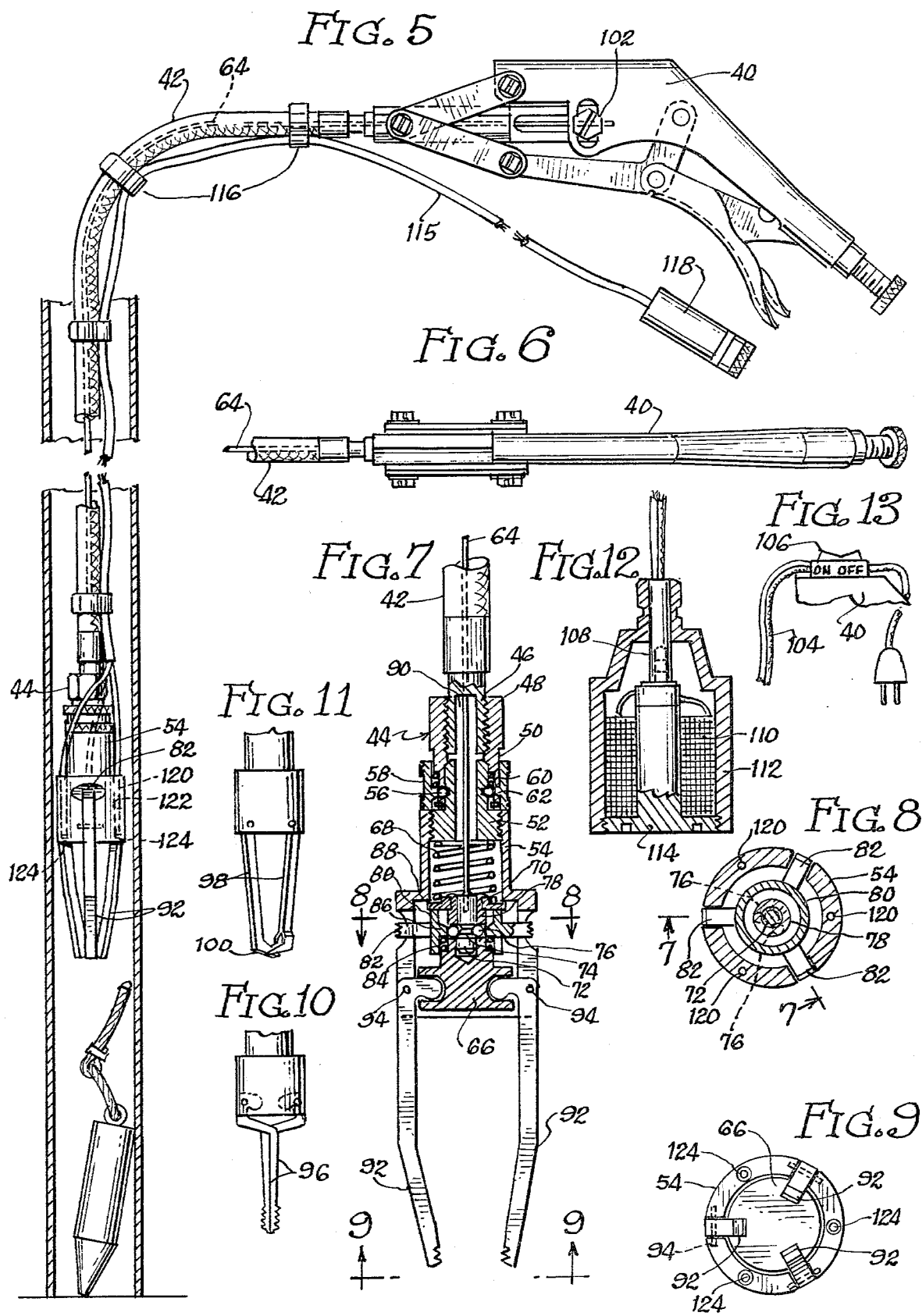

REMOTE RETRIEVER WITH INTERCHANGEABLE HEAD

The present application is a continuation-in-part of application Ser. No. 846,883, filed Oct. 31, 1977, now U.S. Pat. No. 4,135,753.

BACKGROUND OF THE INVENTION

The invention of the parent patent application is a flexible, Bowden wire cable having a Vise Grip type actuator and control handle, with a gripping head on the bottom end of the Bowden wire cable for grasping lost plumb bobs and like items from hard-to-get-to places.

The device of the parent application is quite useful, and the gripping head is to a certain extent interchangeable with other heads by means of set screws. However, there is a need for an interchangeable head connecting structure which will permit the variegated head types to be used with the same basic device, such variation to include as a possibility an electromagnetic head attachment and heads having accommodations for a fiber optic system which both illuminates the area immediately in front of the gripping head, and provides a viewer adjacent the handle through which can be seen the illuminated area.

SUMMARY OF THE INVENTION

The present invention provides such an improved instrument. The basic innovation of the continuation-in-part application is a quick-release structure utilizing in the disclosed and described embodiment a pair of oppositely directed standard hose clamps of different size to join respectively the outer sheath and inner cable through the gripping head. Each head is one of several which are designed to meet different specifications and are interchangeable and replaceable by means of pulling the outer collars of the hose clamps in opposite directions. The first head can thus be freed and to connect the second head it need merely be pushed into the first hose clamp while the actuator members of both clamps are held apart.

Another innovation in the instant application is the incorporation of a fiber optic viewing system, preferably having three or more fiber groups entrained along the main support cable and entering into bores in the gripping head. Terminating the individual strands are small lenses which in the case of light source transmission fibers project light in front of the gripping head, and receiver fibers transmit their received light through the lenses to a viewer at the upper end of the optic cable adjacent the gripper handle.

BRIEF DESCRIPTION OF THE DRAWINGS

FIG. 1 is a side elevation view of a first embodiment of the instrument showing portions in phantom;

FIG. 2 is a diagrammatic view of the lower portion of the device of FIG. 1 extended down a measuring pipe;

FIG. 3 is a fragmentary left end view of FIG. 1;

FIG. 4 is a bottom view of the head of the instrument shown in FIG. 1;

FIG. 5 is a side elevation view of the instrument in a sounding tube showing the tube in section;

FIG. 6 is a top view of the handle of the instruments shown in FIG. 5;

FIG. 7 is a sectional view taken through the head of the instrument which is shown in FIG. 5;

FIG. 8 is a sectional view taken along lines 8—8 of FIG. 7;

FIG. 9 is a view of the head as seen from line 9—9 of FIG. 7;

FIG. 10 is a diagrammatic view of an alternative head embodiment;

FIG. 11 is another alternative embodiment of the head structure;

FIG. 12 is an alternative head utilizing an electromagnet rather than mechanical gripping means;

FIG. 13 is a fragmentary view of an electrical switch and wiring used in the electromagnetic embodiment.

DETAILED DESCRIPTION OF THE PREFERRED EMBODIMENT

The first embodiment of implement is indicated generally by the numeral 10 and has a handle comprised of a base member 11 and a squeeze lever 12. The squeeze lever 12 cooperates with an over-the-center brace 14, a pivotal member 15, and an extension spring 16 to achieve an action which was popularized by Vise Grip pliers. This action is characterized by its over-the-center feature in which as the squeeze lever 12 approaches the base member 11 such that the pivot point between the brace 14 and the squeeze lever 12 passes a certain point, the handle snaps together and locks the jaws. The point at which this occurs can be varied by adjusting the screw 17 in the base member, and release of the handle once it is locked is accomplished by depressing release lever 13.

This handle is connected to a Bowden wire coupling which includes a pair of levers 18 and a pair of levers 19 which are pivoted by pins 20 or the like to the base member and pivot arm 15. The lower ends of these levers are co-axially pivoted to the sides of seating sleeve 21 by a common pin 22.

A set screw 23 is utilized to firmly secure the flexible but axially incompressible sheath 24 of the Bowden wire assembly into a seat in the coupling sleeve 21. The actuator cable 25, which is inextensible but freely slidable within the flexible sheath 24, passes freely through a bore in the sleeve 21 to be anchored in the base member 11 by a set screw 26 as can best be seen in FIG. 3. This set screw permits the sliding out and removal of the actuator cable 25 in a simple fashion in the event that the gripping head need to removed or replaced.

The Bowden wire enters the gripping head wherein the outer sheath 24 is secured by a set screw 27 in a shoulder 28 which is an integral part of a casing 29. The actuator cable 25 extends through this shoulder and into an open space defined interiorly of the casing 29 and inside a plunger 30, to which it is secured by means of a set screw 31 seated in a bore in a shoulder of the plunger. This shoulder also provides a face which compresses a coil spring 32 against the rear end wall 33 of the housing 29. This urges the plunger downward and causes the jaw elements to open as will be understood hereinafter.

The open front end of the casing 29 is provided with several slots 34 and in each of these slots a jaw element 34a having gripping teeth 35 is inserted. These jaw elements are each pivoted on a pin 36 which passes through a somewhat tangential bore provided in the casing 29 as is best seen in FIG. 4.

The operation of the jaw elements 34a is accomplished by axial movement of the plunger 30 which has an annular groove in which cam arms 37 extending from the jaw elements seat. It can be visualized from FIG. 1 that as the plunger moves to and fro, the jaw elements are caused to expand and contract by means of the action of the plunger on these cam arms 37.

OPERATION

FIG. 2 illustrates diagrammatically the operation of the implement. A fuel checking tube 38 of the type characteristically found in the fuel tank of large vessels is shown, and in the bottom of this pipe or tube 38 a plumb bob 39 rests which has broken off of its retaining measuring line. Ordinarily, the outside diameter of the cylindrical casing 29 would fit within the pipe 38 fairly snugly but without binding, and as the jaw elements 34a are expanded they define an extension of the casing 29, and it is easily seen that as they expand somewhat beyond the straight out position, they brush against the interior of the fuel tube and will slip around the lost plumb bob very easily.

Once it is felt that the gripping head is as far down the tube as it will go, the handle is squeezed closed and it snaps into its locked position, where it stays automatically until released. While the handle is so locked, the Bowden wire is retracted from the tube and the plumb bob retrieved.

Several features of the mechanics of the device should be noted. First of all, because the locking mechanism is on the handle, the maximum degree of play, which is naturally inherent in the slightly compressible sheath and slightly extendable core cable, is incorporated in the device to provide a springy, or for giving, feature so that unnecessary force would not be delivered to the head mechanism. If this play becomes too great, the slack is easily taken out by simply adjusting the set screw 17, or for more major adjustments set screw 26 can be used to withdraw a length of the core cable 25.

The pivoted lever arms 18 and 19, in addition to orienting the forces to axially displace the core cable, also have the affect of greatly increasing the leverage of the handle over the Bowden wire the closer the lever arms become. The affect of this is first of all to insure a very firm gripping action at the gripping head, but also this action enables the handle to operate under a very slight pressure when it is at or near its locking mode. This makes the device very easy to operate and easy to unlock with or without the release lever 13.

Major modifications of the above-described structure are illustrated on the second sheet of drawings, wherein implementations of the instrument having a head specifically designed to be easy and quickly releasible are disclosed. Referring to FIG. 5, a handle of the type shown in FIG. 1 is indicated at 40. This handle utilizes the same basic parts of the first described handle, including the squeeze action, and such will not be described again.

From this handle a flexible hollow sheath 42 extends in the illustration down into a sounding tube 38 to grip the lost plumb bob 39. This outer sheath seats in the front end of the handle as has been described, and the other end terminates in what will be described as a standard hose connection 44. To mount this connection 44, the sheath terminates in a threaded sleeve 46 on which is engaged the mounting collar 48 of the hose connection. This collar has a downward extension as shown in FIG. 7 at 50 which defines a hollow interior space to slidably receive the mounting nipple 52 whose lower end threadably engages the main body portion 54 of the gripping head.

The mounting nipple 52 is maintained within the extension 50 of the coller 48 by means of detent balls 56 which simultaneously engage, and thus lock together, suitable holes and hollows in the members 50 and 52, respectively, in the operating mode shown in FIG. 7.

To release member 52 from member 48, an outer releasing collar 58 is slid upwardly against the compression of spring 60, carrying with it the integral keys 62 which permit the detent balls 56 to escape from the hollows in the mounting nipple 52. This releases the mounting nipple together with its body 54 of the gripping head from the flexible sheath 42.

However, it will be noted that the actuator cable 64, which passes through the sheath and in its Bowden wire configuration acts as the extension member to withdraw plunger 66 against compression spring 68 is still connected to the gripping head. Release of the actuator cable from the head is accomplished by operating a standard hose connection as already described except that it is modified slightly. Second hose connection 70 has a central plug 72 with an annular groove 74 which seats retainer balls 76, which also engage in bores through fixed outer sleeve member 78 which extends from the plunger 66. An outer sleeve 80, having arms 82 extending to the sides of the head body 54, is pushed downwardly against the action of spring 84, which moves the keys 86 free of the retainer balls, thus freeing the center plug. A stop 88 is mounted to the sleeve 78 to define a limit of travel for the sleeve.

Looking at the head as a whole, it can be seen that by pulling the collar 58 in the opposite direction from the arms 82, both the hose couplings will be released, freeing both the sleeve and the actuator cable. This will enable the plug 72 to pass through the corridor 90 provided in the upper hose coupling so that the head is very easily released. Reconnection of the head, or of a modified embodiment of the head, requires the reverse of the above-described release operation.

The body portion 54 of the head of the type shown in FIG. 7 has three jaw elements 92 which are pivoted on pins 94 and are actuated by means of the plunger 66. This operation has been described above. For the sake of example, other mechanical gripping heads operated on the Bowden wire principal are shown in FIGS. 10 and 11. FIG. 10 displays jaw elements 96, which expand outwardly upon operation of the handle 40, and FIG. 11 shows jaw elements 98 which are similarly designed and operated to elements 92, but have lower ends 100 adapted to pick up small objects from a flat surface. Both of these modified embodiments can be snapped on and snapped off of the Bowden wire cable by virtue of the dual, standard hose clamp connections described in reference to FIG. 7.

In another modification of the device which departs from the Bowden wire concept, because of the releasing set screw 102 which is virtually identical to screw 26 in FIG. 1, the center actuator cable of the Bowden wire can be pulled free of the outer sheath from the head end. This is not ordinarily necessary, as the cable is releasible from the head at the opposite end.

However, once the center cable is withdrawn, a different kind of actuator cable 104, shown in FIG. 12, can be inserted up through the sheath. This cable is an electrical cable and would not ordinarily be detained by the set screw 102, but would exit the sheath in the handle area, passing through a control switch 106, mounted on the handle, and then be plugged into an electrical outlet.

This cable is duel filament and connected by means of a jack 108 to an electromagnet 110, which has a suitable housing 112. This housing would be as resistent to the passage thereto of magnetic flux as possible, with a ferromagnetic plug 114 to direct the magnetic field downwardly as much as possible. The operation of the electromagnetic embodiment of the implement should be obvious from the above description.

In a further improvement of the device, a fiber optic cable 115 is fastened exteriorly by means of clips 116 to the outer sheath 42. The upper end of the optic cable is operatively connected to a light source and eye piece 118 and the lower end splits into at least two subclusters of cables 120, there being three in the illustration. These subclusters pass through bores 122 which pass through the gripping head and terminate in lenses 124. At least one of the filament subclusters transmits light from the light source at 118, and at least one other receives the image and transmits the image back to the eye piece, also at 118.

The lenses 124 are no larger than the ends of the filament subclusters so that these strands 120 can be pulled free of the gripping head to make it completely removable.

The tool as shown, described and claimed above represents an advance in the art as exemplified in the extremely simply operated head release and reconnection means which permits for the first time a modern gripping device to be used interchangeably with a number of different heads designed for different applications.

The addition of the optical system permits the flexibility inherent in the interchangeable head structure to be carried through to incorporate a versatility in use made possible by the elimination of the requirement of operating blind. In summary, the flexibility, versatility and ease of use present in the instant design makes it a significant advance in the remote gripping art.

I claim:

1. A retrieving instrument comprising:
   (a) a handle;
   (b) a flexible outer sheath mounted at one end to said handle;
   (c) an inner actuation cable housed in said outer sheath;
   (d) a quick-release head having a body mounted by a first quick-release mechanism to the other end of said sheath and having a plurality of expansible and contractable jaw elements operatively connected to said actuator cable by a second quick-release mechanism, both of said quick-release mechanisms having axially displaceable actuators which are pulled in mutually opposite directions to release same, whereby said head can be quickly removed and replaced with another head;
   (e) said jaw elements being operable by the axial motion of said actuator cable in said sheath to operate said head between a release mode and a retrieving mode; and
   (f) control means mounted on said handle and having two operative positions for operating said actuator cable between said two modes and means to set said control means in either of said positions to positively establish said head in either of said modes.

2. A retrieving instrument comprising:
   (a) a handle;
   (b) a flexible outer sheath mounted at one end to said handle;
   (c) an inner actuation cable housed in said outer sheath;
   (d) a quick-release head having a body mounted by a first quick-release mechanism to the other end of said sheath and having a plurality of expansible and contractable jaw elements operatively connected to said actuator cable by a second quick-release mechanism whereby said head can be quickly removed and replaced with another head;
   (e) said jaw elements being operable by the axial motion of said actuator cable in said sheath to operate said head between a release mode and a retrieving mode;
   (f) control means mounted on said handle and having two operative positions for operating said actuator cable between said two modes and means to set said control means in either of said positions to positively establish said head in either of said modes; and,
   (g) said head having at least two longitudinal channels bored therethrough and including a fiber optics light system communicating light from a light source adjacent said handle through one of said channels to illuminate the work area and further including a second fiber optics system having a pick up on said head and passing through the other of said channels to terminate in an eyepiece adjacent said handle.

3. A retrieving instrument comprising:
   (a) a handle;
   (b) a flexible outer sheath mounted at one end to said handle;
   (c) an inner actuation cable housed in said outer sheath;
   (d) a quick-release head having a body mounted by a first quick-release mechanism to the other end of said sheath and having a plurality of expansible and contractable jaw elements operatively connected to said actuator cable by a second quick-release mechanism whereby said head can be quickly removed and replaced with another head;
   (e) said jaw elements being operable by the axial motion of said actuator cable in said sheath to operate said head between a release mode and a retrieving mode;
   (f) control means mounted on said handle and having two operative positions for operating said actuator cable between said two modes and means to set said control means in either of said positions to positively establish said head in either of said modes; and,
   (g) the other end of said sheath terminating in a collar having holes therein and said head defines a hollow nipple having an external groove and fitting within said collar, and said first quick-release mechanism comprising an axially adjustable collar selectably confining and releasing a plurality of balls in said holes and groove.

* * * * *